United States Patent [19]
Hoffman

[11] 3,835,119
[45] Sept. 10, 1974

[54] POLY (PHOSPHINE OXIDE DERIVATIVE) WITH AMMONIUM POLYPHOSPHATE AS A FLAME RETARDANT COMPOSITION FOR POLYMERS

[75] Inventor: Joseph Adrian Hoffman, Somerville, N.J.

[73] Assignee: American Cyanamid Company, Stamford, Conn.

[22] Filed: June 28, 1973

[21] Appl. No.: 374,728

[52] U.S. Cl..... 260/45.75 R, 252/8.1, 260/45.75 K, 260/465 F, 260/465 H
[51] Int. Cl..... C08g 45/56, C08g 51/60, C09k 3/28
[58] Field of Search..... 260/45.9 NP, 465 F, 465 H, 260/45.75 R, 45.75 K; 252/8.1

[56] References Cited
UNITED STATES PATENTS

| | | | |
|---|---|---|---|
| 2,666,078 | 1/1954 | Ferguson | 252/8.1 |
| 3,663,502 | 5/1972 | Murry et al. | 252/8.1 |
| 3,783,146 | 1/1974 | Savides et al. | 260/45.9 NP |

*Primary Examiner*—Donald E. Czaja
*Assistant Examiner*—Gary R. Marshall
*Attorney, Agent, or Firm*—Frank M. Van Riet

[57] ABSTRACT

Flame-retardant compositions comprising (a) a poly (phosphine oxide derivative) having the formula (A)

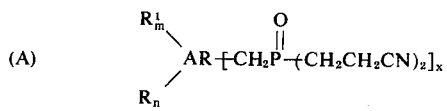

wherein R and $R^1$ are individually, methyl, ethyl or methoxy radicals, AR is benzene, napthalene or anthracene and when AR is benzene, $n$ and $m$ are individually whole integers of 0–2, inclusive, $x$ is a whole integer of 2–6, inclusive and R and $R^1$ can combine to form a saturated, six-membered hydrocarbon ring in conjunction with two adjacent carbon atoms of the benzene ring, when AR is napthalene, $n$ and $m$ are individually, whole integers of 0–3, inclusive, and $x$ is a whole integer of 2–4, and when AR is anthracene, $n$ and $m$ are, individually, whole integers of 0–4, inclusive, and $x$ is a whole integer of 2–6, inclusive, and (b) ammonium polyphosphate and flame-retardant polymers containing the same, are disclosed.

16 Claims, No Drawings

POLY (PHOSPHINE OXIDE DERIVATIVE) WITH AMMONIUM POLYPHOSPHATE AS A FLAME RETARDANT COMPOSITION FOR POLYMERS

CROSS-REFERENCE TO RELATED APPLICATION

This application is related to my copending application, Ser. No. 374,709, filed of even date herewith and entitled POLY (PHOSPHINE OXIDE) FLAME-RETARDANTS.

BACKGROUND OF THE INVENTION

The use of combinations of ammonium polyphosphate and alkylenebisphosphine oxides to flame-proof thermoplastic polymers is known, see U.S. Pat. No. 3,663,502. These combinations, although effective flame retardants for thermoplastics have been found to be relatively incompatible with many polymers such as, for example, polypropylene. As a result, they are extremely difficult to incorporate into such polymers, especially with regard to the phosphine oxide component thereof, by conventional extrusion and injection molding techniques since they tend to exude from the polymer. Therefore, uniform dispersions of the alkylenebisphosphine oxide-ammonium polyphosphate combinations are difficult to achieve. A second, and sometimes more detrimental, disadvantage of these known flame-retardant combinations resides in the fact that the phosphine oxide components thereof are relatively water-soluble and in certain applications of the polymers to which they are added, such as components in dish and clothes washers, they tend to be extracted out of the polymer upon contact thereof with water. Consequently the polymer becomes more readily flammable and ultimately fails to pass the Underwriter's Laboratory test of acceptable flame-retardance.

SUMMARY

I have now discovered that these and other less objectionable deficiencies of the alkylenebisphosphine oxideammonium polyphosphate combinations can be overcome, and excellent flame-retardant properties can be achieved, by incorporating into thermoplastic polymers a combination of ammonium polyphosphate and a compound conforming to the formula set forth hereinabove. These novel combinations impart flame-retardance to thermoplastic polymers at relatively low concentrations, are easily incorporated into the polymers using conventional techniques and do not leach out of the polymer when it is used in conjunction with water after having been formed into a particular article of manufacture.

DESCRIPTION OF THE INVENTION INCLUDING PREFERRED EMBODIMENTS

As mentioned briefly above, I have now found that excellent flame-retarding properties can be imparted to thermoplastic polymers by incorporating into the polymer a synergistic combination of ammonium polyphosphate and a compound conforming to at least one of the following formulae

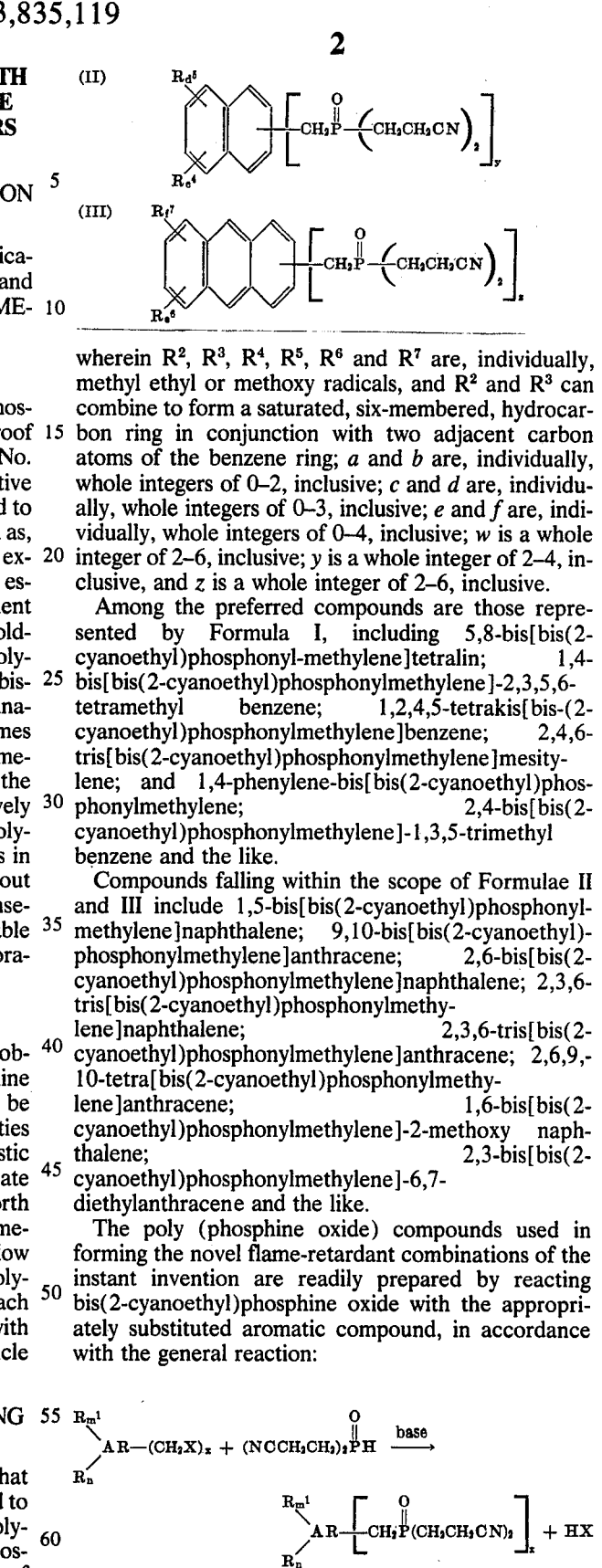

wherein $R^2$, $R^3$, $R^4$, $R^5$, $R^6$ and $R^7$ are, individually, methyl ethyl or methoxy radicals, and $R^2$ and $R^3$ can combine to form a saturated, six-membered, hydrocarbon ring in conjunction with two adjacent carbon atoms of the benzene ring; $a$ and $b$ are, individually, whole integers of 0–2, inclusive; $c$ and $d$ are, individually, whole integers of 0–3, inclusive; $e$ and $f$ are, individually, whole integers of 0–4, inclusive; $w$ is a whole integer of 2–6, inclusive; $y$ is a whole integer of 2–4, inclusive, and $z$ is a whole integer of 2–6, inclusive.

Among the preferred compounds are those represented by Formula I, including 5,8-bis[bis(2-cyanoethyl)phosphonyl-methylene]tetralin; 1,4-bis[bis(2-cyanoethyl)phosphonylmethylene]-2,3,5,6-tetramethyl benzene; 1,2,4,5-tetrakis[bis-(2-cyanoethyl)phosphonylmethylene]benzene; 2,4,6-tris[bis(2-cyanoethyl)phosphonylmethylene]mesitylene; and 1,4-phenylene-bis[bis(2-cyanoethyl)phosphonylmethylene; 2,4-bis[bis(2-cyanoethyl)phosphonylmethylene]-1,3,5-trimethyl benzene and the like.

Compounds falling within the scope of Formulae II and III include 1,5-bis[bis(2-cyanoethyl)phosphonylmethylene]naphthalene; 9,10-bis[bis(2-cyanoethyl)-phosphonylmethylene]anthracene; 2,6-bis[bis(2-cyanoethyl)phosphonylmethylene]naphthalene; 2,3,6-tris[bis(2-cyanoethyl)phosphonylmethylene]naphthalene; 2,3,6-tris[bis(2-cyanoethyl)phosphonylmethylene]anthracene; 2,6,9,10-tetra[bis(2-cyanoethyl)phosphonylmethylene]anthracene; 1,6-bis[bis(2-cyanoethyl)phosphonylmethylene]-2-methoxy naphthalene; 2,3-bis[bis(2-cyanoethyl)phosphonylmethylene]-6,7-diethylanthracene and the like.

The poly (phosphine oxide) compounds used in forming the novel flame-retardant combinations of the instant invention are readily prepared by reacting bis(2-cyanoethyl)phosphine oxide with the appropriately substituted aromatic compound, in accordance with the general reaction:

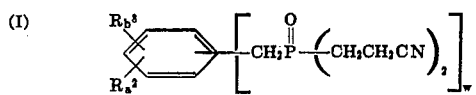

wherein X is a halogen and $x$, $n$, $m$, R, $R^1$ and AR are as set forth above.

The intermediate halomethylated aromatic compounds may conveniently be prepared by reacting the corresponding benzene, naphthalene or anthracene with formaldehyde and a hydrogen halide e.g., hydrogen chloride; hydrogen bromide etc., according to known procedures such as those disclosed in U.S. Pat. Nos. 2,945,894; 2,951,100; 2,973,391; 3,069,480. Alternatively, chlorination of the alkyl group or groups of the appropriate methyl benzene, methyl naphthalene or methyl anthracene in the presence of suitable catalysts, see U.S. Pat. No. 2,926,202, or with chlorine absorbed on zeolite and under reactive conditions, see U.S. Pat. No. 2,956,084, may be effected.

The poly (phosphine oxides) may be prepared according to the above general reaction in an organic solvent which is inert to the reaction and the components thereof. Methanol has been found to be an effective solvent, however, other alcohols may also be used. The reaction is best conducted in the presence of a proton acceptor such as a strong base e.g. potassium or sodium hydroxide, in amounts equivalent to the amount of hydrogen halide evolved.

The reaction is generally conducted at a temperature ranging from about 10°C. to about 60°C. under atmospheric pressure. Subatmospheric or superatmospheric pressure can be used, if desired. No catalysts are necessary.

The ammonium polyphosphates which constitute the second critical component of my novel flame-retardant compositions are well known in the art as shown in U.S. Pat. Nos. 3,423,343 and 3,513,114, which patents are hereby incorporated herein by reference. These ammonium polyphosphates are generally substantially water-insoluble and possess a plurality of P—O—P type linkages. They can be represented by formula $$H_{(g-h)+2}(NH_4)_n P_g O_{3g+1} \quad \text{(IV)}$$

wherein $g$ is an integer having an average value greater than 10, $h/g$ is between about 0.7 and about 1.1 and the maximum value of $h$ is equal to $g+2$. They are straight or branched chain structures having nearly all the nitrogen present therein as ammonical nitrogen. The average numerical value of $g$, using end group titration after acid formation, is from about 20–400, while using the light scattering method, the average weight value of $n$ is above about 500, preferably 500–100,000 and especially preferably 1,000–30,000. The ammonium polyphosphates exhibit different crystalline forms but are also found in the non-crystalline or amorphous form also.

The combination of poly (phosphine oxide) and ammonium polyphosphate may be incorporated into the thermoplastic polymers in flame-retarding amounts. Concentrations of from about 10–25 percent, by weight, preferably from about 15–25 percent, by weight, based on the weight of the polymer, of the combination have been found effective. The ratio of poly (phosphine oxide) to ammonium polyphosphate should range from about 2:1 to about 1:2, respectively.

The novel compositions of my invention may be incorporated into the polymers by any known method. For example, the composition may be combined with the polymer by milling the two on a two-roll mill, mixing in a Banbury mixer, extrusion, injection molding or the like. The combination may also be incorporated into the polymer by adding it to the polymerization media during the polymer manufacture, provided the ingredients, catalysts etc. therein are inert thereto.

The thermoplastic polymers to which the novel poly (phosphine oxide)-ammonium polyphosphate compositions may be incorporated to produce the novel flame-retarded compositions of the instant invention are generally those produced from at least one ethylenically unsaturated monomer, wherein the monomer, or monomers, are polymerized, by any known method, via the ethylenic unsaturation therein. Preferred examples of polymers conforming to this definition include the polyolefins i.e., those polymers produced from ethylene, propylene etc. including copolymers thereof with such monomers as vinyl acetate etc. and homopolymers thereof i.e., polyethylene; polypropylene etc. I may also use the linear aromatic polyesters such as polyethylene terephthalate; polybutylene terephthalate; poly (1,4-cyclohexanedimethylene)terephthalate etc.; the polyalkylene oxides such as polyethylene oxide; nylon; rayon; polyphenylene oxide; butadiene polymers such as the so-called "impact polymers" i.e., acrylonitrilebutadiene-styrene polymers; acrylonitrile-styrene-methyl methacrylate grafted polybutadiene; cellulose acetate and propionate; etc. Further examples of polymers which may be flameproofed are set forth in U.S. Pat. No. 3,284,543, hereby incorporated herein by reference.

It is within the scope of the present invention to incorporate such ingredients as plasticizers, dyes, pigments, fillers, stabilizers, antioxidants, antistatic agents etc. into my novel flame-retarded compositions without detracting from the advantageous properties exhibited thereby.

The following examples are set forth for purposes of illustration only and are not to be construed as limitations on the present invention except as set forth in the appended claims. All parts and percentages are by weight unless otherwise specified.

EXAMPLE 1

Ten parts of 1,4-bis[bis(2-cyanoethyl)phosphonyl methylene]2,3,5,6-tetramethyl benzene and 15 parts of ammonium polyphosphate are dry blended with polypropylene, extruded at 420°F. and chopped into pellets. The pellets are then injection molded at 400°–450°F. in bars ¼ inch × ½ inch × 5 inches. Sample bars are then measured for flammability in accordance with Underwriter's Laboratory Test UL-94 before and after subjection to UL Water Extraction Test, Subject 746, Mar. 1, 1957, paragraph E6. The water extraction test requires that the samples be immersed in water at 70°C. for 7 days, the water being changed daily for the first five days. At the end of the immersion, the bars are dried in a dessicator before burning. Before and after extraction, each bar is designated as self-extinguishing.

EXAMPLE 2

When the concentration of the ammonium polyphosphate of Example 1 is reduced to 10 parts, all else remaining equal, the designation of the bars, before and after extraction, is again self-extinguishing.

Following the procedure of Example 1, various other poly (phosphine oxides) are substituted for that disclosed therein, blended with ammonium phosphate, incorporated into a thermoplastic polymer in the amounts indicated and tested using Test UL-94. The results are set forth in Table I, below.

Table I

| Ex. | Poly (Phosphine Oxide)-% | Polyphosphate-% | Polymer | Test Results Before Extraction | Test Results After Extraction |
| --- | --- | --- | --- | --- | --- |
| 3 | 1,2,4,5-tetrakis[bis(2-cyanoethyl) phosphonylmethylene]benzene-8% | 10% | Polypropylene | SE | SE |
| 4 | 2,4,6-tris[bis(2-cyanoethyl) phosphonylmethylene]mesitylene-10% | 10% | Polyethylene | SE | SE |
| 5 | 1,4-phenylenebis[bis(2-cyanoethyl) phosphonylmethylene]-10% | 15% | Polypropylene | SE | SE |
| 6 | 4,6-bis[bis(2-cyanoethyl)phosphonyl-methylene]-1,3dimethyl benzene-12% | 8% | Poly(1,4-cyclo-hexanedimethylene) Terephthalate | SE | SE |
| 7 | 2,5-bis[bis(2-cyanoethyl)phosphonyl-methylene]-1,4-dimethoxybenzene-10% | 9% | Polybutylene Terephthalate | SE | SE |
| 8 | Hexa[bis(2-cyanoethyl)phosphonyl-methylene]benzene-8% | 10% | Polypropylene | SE | SE |
| 9 | 1,2,4,5,6-penta[bis(2-cyanoethyl) phosphonylmethylene benzene-8% | 10% | Polyethylene | SE | SE |
| 10 | 1,4-bis[bis(2-cyanoethyl)phosphonyl-methylene]-2,5-diethylbenzene-10% | 10% | Polyethylene | SE | SE |
| 11 | 1,5-bis[bis(2-cyanoethyl) phosphonyl-methylene]naphthalene-10.0% | 10.0% | Polypropylene | SE | SE |
| 12 | 9,10-bis[bis(2-cyanoethyl)phosphonyl-methylene]anthracene-10.0% | 10.0% | Polypropylene | SE | SE |
| 13 | 5,8-bis[bis(2-cyanoethyl)phosphonyl-methylene]tetralin-10.0% | 10.0% | Polypropylene | SE | SE |
| 14 | 2,4-bis[bis(2-cyanoethyl)phosphonyl-methylene]-1,3,5-trimethyl benzene-10.0% | 10.0% | Polyethylene | SE | SE |

SE=Self-extinguishing

In addition to the superior results exhibited above by the synergistic combination of the ammonium polyphosphate and poly (phosphine oxide), I have also discovered that these unique combinations can be further modified by the incorporation therewith, into thermoplastic polymers, of various metal oxides and/or carbonates. The addition of these oxides and carbonates results in the production of polymers which are not only rendered flame-retardant but non-dripping, i.e. when the polymer is burned, the material does not drip, either as a burning or a molten mass.

The metal oxides or carbonates are added to the polymer in an amount ranging from about 0.5 percent to about 5 percent, by weight, based on the weight of the polymer. The manner in which the metal oxide or carbonate is added is not critical and it can be added to the polymer before, along with or after the phosphine oxide-ammonium polyphosphate combination. Amounts higher than about 5 percent are generally undesirable. I have found that alkaline earth metal oxides such as barium oxide, magnesium oxide, etc.; alkaline earth metal carbonates such as magnesium carbonate, calcium carbonate etc.; Group IV-A metal oxides such as silicon dioxide, stannic oxide, etc.; titanium dioxide; zinc oxide; antimony oxide and the like can be used. While some of the compounds function at low concentrations, e.g., about 0.5 percent but not at about 5.0 percent, others perform at the higher level only. In all cases, however, the metal oxides or carbonates function to prevent dripping in a synergistic manner with the flame-retardant combination at a concentration within the above range.

The examples below clearly illustrate the unique effect afforded by the use of the oxide or carbonate in conjunction with the flame-retardant combinations of the examples above. The tests used, percentages, manner of incorporation, et conform to those enumerated above. The results are set forth in Table II.

Table II

| Ex. | Poly (Phosphine Oxide)-ammonium Polyphosphate Flame Retarded Polymer of Example Number | Oxide Or Carbonate-% | Flame Test Results-UL-94 |
| --- | --- | --- | --- |
| 15 | 3 | Magnesium Oxide-1.0% | Self-extinguishing and non-dripping |
| 16 | 11* | Titanium Dioxide-1.0% | do. |
| 17 | 4 | Silicon Dioxide-1.0% | do. |
| 18 | 7 | Do-1.0% | do. |
| 19 | 2 | Titanium Dioxide-1.0% | do. |
| 20 | 12* | Do-1.0% | do. |
| 21 | 6 | Zinc Oxide-2.0% | do. |

Table II — Continued

| Ex. | Poly (Phosphine Oxide)-ammonium Polyphosphate Flame Retarded Polymer of Example Number | Oxide Or Carbonate-% | Flame Test Results-UL-94 |
| --- | --- | --- | --- |
| 22 | 9 | Stannic Oxide-5.0% | do. |
| 23 | 1 | Titanium Dioxide-1.0% | do. |
| 24 | 10 | Antimony Oxide-1.0% | do. |
| 25 | 5 | Titanium Dioxide-1.0% | do. |
| 26 | 8 | Magnesium Carbonate-2.0% | do. |
| 27 | 13* | Titanium Dioxide-1.0% | do. |

*=Melt Index Method of preparing specimen used. In this method the polymer and flame-retardant are dry blended and extruded into an irregular shaped extrudate. This extrudate is then tested.

EXAMPLE 28*

When the flame-retardant composition of Example 6 of Table I is utilized to flame-proof polypropylene at a ratio of poly (phosphine oxide)-ammonium polyphosphate-titanium dioxide of 10/15/1, the flammability is rated self-extinguishing.

* See Table II footnote

EXAMPLE 29*

The procedure of Example 21 is again conducted except that a ratio of poly (phosphine oxide) to ammonium polyphosphate to titanium dioxide is 10/10/1 is used. The resultant composition is again rated as self-extinguishing.

* See Table II footnote

EXAMPLE 30*

The procedure of Example 1 is again followed except that 2,5-bis[bis(2-cyanoethyl)phosphonylmethylene]-1,4-dimethylbenzene is used at a ratio of poly (phosphine oxide) to ammonium polyphosphate to titanium dioxide of 10/10/1 is used and the polymer to which it is added is polypropylene. The resultant composition is again rated self-extinguishing.

* See Table II footnote

I claim:

1. A flame-retardant composition comprising (a) a compound having the formula

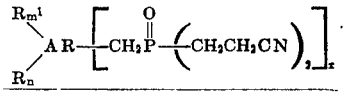

wherein R and $R^1$ are, individually, methyl, ethyl or methoxy radicals, AR is benzene, naphthalene, or anthracene and when AR is benzene, $n$ and $m$ are, individually, whole integers of 0–2, inclusive, $x$ is a whole integer of 2–6, inclusive, and R and $R^1$ can combine to form a saturated, six-membered, hydrocarbon ring in conjunction with two adjacent carbon atoms of the benzene ring, when AR is naphthalene, $n$ and $m$ are, individually, whole integers of 0–3, inclusive, and $x$ is a whole integer of 2–4, inclusive, and when AR is anthracene, $n$ and $m$ are, individually, whole integers of 0–4, inclusive, and $x$ is a whole integer of 2–6, inclusive, and (b) ammonium polyphosphate.

2. A composition according to claim 1 wherein AR is benzene, R and $R^1$ are methyl, and $x$, $n$ and $m$ are 2.

3. A composition according to claim 1 wherein AR is benzene, $x$ is 4 and $n$ and $m$ are 0.

4. A composition according to claim 1 wherein AR is benzene, R and $R^1$ are methyl, $x$ is 3, $n$ is 2 and $m$ is 1.

5. A composition according to claim 1 wherein AR is benzene, R is methyl, $x$ is 2, $n$ is 2 and $m$ is 0.

6. A composition according to claim 1 containing, in addition thereto, (c) from about 0.5 percent to about 5.0 percent, by weight, based on the weight of the polymer to which the composition is to be added of (1) an alkaline earth metal carbonate, (2) an alkaline earth metal oxide, (3) a Group IV-A metal oxide, (4) titanium dioxide, (5) zinc oxide or (6) antimony oxide.

7. A composition according to claim 6 wherein (c) is titanium dioxide.

8. A composition according to claim 6 wherein AR is benzene, R and $R^1$ are methyl, and $x$, $n$ and $m$ are 2.

9. A composition according to claim 6 wherein AR is benzene, R and $R^1$ are methyl, $x$, $n$ and $m$ are 2 and (c) is titanium dioxide.

10. A composition according to claim 9 wherein (a) is present at about 10 percent, (b) is present at about 10 percent and (c) is present at about 1.0 percent.

11. A composition according to claim 6 wherein AR is benzene, R is methyl, $x$ is 2, $n$ is 2, $m$ is 0 and (c) is titanium dioxide.

12. A flame-retarded polymer comprising a polyolefin or a linear aromatic polyester and a flame-retarding amount of a composition of claim 1.

13. A flame-retarded composition according to claim 12 wherein AR is benzene, R and $R^1$ are methyl and $x$, $n$ and $m$ are 2.

14. A flame-retarded composition comprising a polyolefin or a linear aromatic polyester and a flame-retarding amount of a composition of claim 6.

15. A composition according to claim 14 wherein AR is benzene, R and $R^1$ are methyl, and $x$, $n$ and $m$ are 2.

16. A composition according to claim 15 wherein (c) is titanium dioxide.

* * * * *